3,030,349
METHACRYLIC ESTER POLYMERIZATION

Palmer B. Stickney, Columbus, Ohio, and Wendell Overhults, Silver Spring, and Frank X. Werber, Kensington, Md., assignors, by direct and mesne assignments, to W. R. Grace & Co., New York, N.Y., a corporation of Connecticut
No Drawing. Filed May 6, 1960, Ser. No. 27,271
4 Claims. (Cl. 260—89.5)

This invention is concerned with the polymerization of methacrylic esters. More particularly, this invention is directed to polymerizing methacrylic esters, especially those resulting from the esterification of methacrylic acid with alkanols and glycols having the general formula:

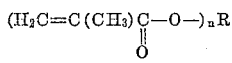

wherein $n$ is either 1 or 2 and R is an alkyl or alkalene group containing 1–8 carbon atoms.

It is known that methyl methacrylate can be polymerized in the presence of aluminum triethyl in a non-polar solvent such as toluene at 0° C. See Belgian Patent No. 566,713. Although the resulting polymer obtained by this method is crystalline and has a melting point in excess of 100° C., the polymerization rate of the system is slow thereby necessitating long polymerization periods which detract from the system's commercial acceptability.

Surprisingly, it has now been found possible to increase the polymerization rate of methacrylic esters of the general formula:

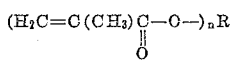

where $n$ is either 1 or 2 and R is an alkyl or alkalene group containing 1 to 8 carbon atoms by subjecting said esters in an inert solvent to the action of an aluminum trialkyl catalyst, in combination with catalytic activators consisting essentially of an anhydrous halide of a rare earth element and an amine. The catalyst system of the instant invention gives a polymerization rate in excess of that obtained by an aluminum trialkyl catalyst per se, and also increases the amount of acetone insoluble polymer.

The reason for the increased polymerization rate is not known. It is known that an anhydrous halide of a rare earth element per se does not polymerized methyl methacrylate. It is also known that an anhydrous halide of a rare earth element in combination with an amine does not polymerize methyl methacrylate. In addition, it is known that aluminum trialkyl in combination with an amine polymerizes methyl methacrylate but yields obtained therefrom are less than that obtained when the catalyst is aluminum trialkyl per se. From the aforesaid disclosures, it can only be reasoned that the catalyst and catalyst activators combined have some unknown synergistic effect which results in the increased polymerization rate, as will be shown by the examples hereinafter. Additionally, it is preferred to add the catalyst and catalyst activators to the system prior to the addition of the monomer to be polymerized. Furthermore, it is necessary that they be added in the following order: rare earth halide, aluminum trialkyl and amine to obtain the optimum results.

In order to show the increased yield of the instant invention over that obtained by using an aluminum trialkyl per se as a catalyst, a polymerization rate defined herein as being equal to $$\frac{\text{grams polymer}}{\text{grams aluminum trialkyl} \times \text{reaction time (hrs.)}}$$

will be used.

The following examples will more clearly explain this invention but are not to be deemed as limiting its scope.

In performing the instant invention, the reaction is carried out under a blanket of an inert atmosphere to insure that the catalyst does not react with oxygen, moisture or other contaminants which tend to deactivate the catalyst. In the examples stated herein, pure dry lamp-grade nitrogen is used as the inert atmosphere. However, the noble gases, especially argon and helium are equally suitable.

Example 1

A 500 ml. round bottom flask fitted with stirrer, condenser, thermometer, nitrogen inlet and neoprene diaphragm for admission of hypodermic needle was charged in a nitrogen dry-box with 50 ml. n-heptane and 0.003 mole $SmCl_3$. The flask was removed from the dry box, its contents agitated, and put under a nitrogen blanket through the inlet tube while heat was applied to maintain a temperature of 70° C. therein. The flask was then charged by hypodermic syringe with 0.006 mole triethyl aluminum through the neoprene diaphragm followed by a hypodermic charge of 0.003 mole of tri-n-butyl amine. 0.28 mole of redistilled methyl methacrylate monomer was then added to the flask. The flask was heated to 85° C. and maintained thereat during the polymerization reaction. After 5 hours, the reaction was terminated and methyl alcohol was added to the flask to inactivate the catalyst system. The solid methyl methacrylate polymer product was filtered, ground in a Waring Blendor with additional methyl alcohol, and dried. The dry product weighed 20.1 grams. The product was refluxed in acetone, cooled to room temperature, and filtered. The dried acetone-insoluble portion weighed 18.1 grams and had a melting point in the range 148–160° C. This melting point range is characteristic of polymethylmethylacrylate which is more crystalline and more stereospecific than polymer prepared by radical initiation. The polymerization rate $$\frac{\text{grams polymer}}{\text{grams aluminum trialkyl} \times \text{reaction time (hrs.)}}$$

of the acetone insoluble polymer product was 5.3. The acetone-soluble polymer product was precipitated from solution with methyl alcohol, filtered, and dried. The dry acetone-soluble polymer product weighed 2 grams. The overall polymerization rate of the system was 5.88.

To point up the increase in polymerization rate obtained by the instant invention over a system wherein an aluminum trialkyl per se is used as catalyst, as taught by the prior art, the following run was made.

Example 2

The equipment and procedure were the same as in Example 1, except that the catalyst consisted of 0.006 mole triethyl aluminum without any catalyst activators. 0.28 mole of methyl methacrylate were charged to the reactor and the reactor was heated from 70° C. to 85° C. After a 5 hour run, the polymerization reaction was discontinued and the solid methyl methacrylate polymer product was separated into acetone soluble and insoluble portions as in Example 1. The dried acetone-insoluble portion weighed 10.5 grams and melted at a temperature in the range 146–160° C. The polymerization rate of the acetone insoluble polymer product was 3.07, and the overall polymerization rate was 3.71. A comparison of the polymerization rates in Examples 1 and 2 show a 50% increase in the overall polymerization rate obtained by the practice of this invention.

Example 3

The equipment procedure and proportion of reactants of Example 1 was followed except that 0.003 mole of YbCl₃ was substituted for the 0.003 mole SmCl₃. 11.2 grams of acetone-insoluble methyl methacrylate polymer product having a melting point in the range of 146–160 was obtained. The polymerization rate for the acetone-insoluble polymer was 3.28. The acetone soluble portion (7.1 grams) had a polymerization rate of 2.09 thereby giving an overall polymerization rate of 5.37.

*Example 4*

The equipment, procedure, and proportion of reactants of Example 1 was followed except that 0.20 mole ethylene dimethacrylate, i.e.

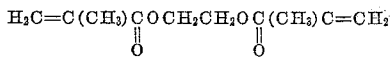

monomer was substituted for the methyl methacrylate monomer. The ethylene dimethacrylate polymer product was washed with 100 ml. methyl alcohol to decompose the catalyst. The solid polymer was filtered, ground in a Waring Blendor, with additional methyl alcohol and dried. The dried polymer product proved acetone insoluble and weighed 19 grams. The polymer product softened at a temperature in excess of 240° C.

The rare earth halides which are operable in the present invention as a catalyst activator include all anhydrous halides of the rare earth elements having atomic numbers 57–71 in the periodic table.

Although the aluminum trialkyl used in all the examples was aluminum triethyl, the aluminum tri-lower alkyls in general are operative in combination with anhydrous halides of the rare earth elements and amines to catalyze the polymerization of the methacrylic esters of the present invention. By lower aluminum tri alkyls is meant aluminum alkyls having 1–8 carbon atoms in the alkyl group.

In addition to the amine specified in the examples, the following are also operable:

| | |
|---|---|
| Methylamine | Dimethyl aniline |
| Dimethylamine | Pyridine |
| Trimethylamine | Gamma colloidine |
| n-Propylamine | α-Naphthylamine |
| Di-isopropylamine | Melamine |
| 2-ethylhexylamine | p-Toluidine |
| Di-n-octylamine | N-methylaniline |
| Trioctylamine | Diphenylamine |
| Aniline | p-Xylidine |
| Triethylamine | c-Phenylenediamine |
| Hexamethylenediamine | Benzidine |

Polymerization is preferably performed in the presence of a solvent. The solvent used in the practice of this invention should be one which is inert and does not interact with either the monomer to be polymerized, the catalyst, catalyst activators, or the growing polymer chain. The preferred inert solvents are dry aliphatic hydrocarbon solvents in the alkane and cycloalkane groups. Examples of the preferred solvents include n-pentane, n-hexane, n-heptane, n-octane, n-nonane, and cyclohexane.

The reaction may be performed under a broad range of temperatures. Since the polymerization rate varies directly with temperatures, it is preferable to use as high a temperature as possible whereat an acetone-insoluble polymer may still be obtained. A temperature range of minus 45 to plus 150° C. is operable, preferably a temperature in the range 15–90° C. is employed.

The polymerization reaction is carried out at atmospheric pressure. Higher or lower pressures are operable but are unnecessary.

The amounts of catalyst and catalyst activators are not critical. Relatively small amounts are operable to form relatively large amounts of polymer. In general a practical range is 0.001–0.1 mole of combined catalyst and activator per mole of monomer to be polymerized. Even larger amounts of combined catalyst and activators are operable but sometimes present a purification problem.

The ratio of the rare earth anhydrous halide to aluminum trialkyl is not critical, nor is the ratio of amine to either the rare earth anhydrous halide or to the aluminum trialkyl critical. Molar ratios of aluminum trialkyl:amine:rare earth anhydrous halide of 1:0.15 to 6:0.3 to 2 are operative; the preferred range is respectively 1:0.3–1:03–0.5.

The acetone-insoluble polymers produced by the present invention can be used in the same manner and means as the polymers formed by the prior art. Such uses include molded and extruded articles of commerce, e.g., signs, automotive ornaments, instrument panel parts, reflectors and the like.

Other monomers of methacrylic esters capable of being polymerized by the instant invention include t-butyl methacrylate, n-hexyl methacrylate, n-butyl methacrylate, n-propyl methacrylate, cyclohexyl methacrylate, isopropyl methacrylate, benzyl methacrylate, phenyl methacrylate, α-naphthyl methacrylate, 1,3-propylene dimethacrylate, 1,8 octylene dimethacrylate, 1,9 nonamethylene dimethacrylate, 1,10 decamethylene dimethacrylate and the like.

We claim:

1. The process of polymerizing a member of the monomer group consisting of methyl methacrylate and ethylene dimethyacrylate which comprises subjecting the group member to the action of a catalyst consisting essentially of aluminum triethyl in combination with catalyst activators consisting essentially of tri-n-butyl amine and an anhydrous trivalent chloride of a member of the group consisting of samarium and ytterbium.

2. A process of obtaining an acetone insoluble polymethylmethacrylate having a melting point in excess of 145° C. which comprises contacting methyl methacrylate in an n-heptane solvent with a catalyst consisting essentially of aluminum triethyl in combination with catalyst activators consisting essentially of tri-n-butyl amine and an anhydrous trivalent chloride of a member of the group consisting of samarium and ytterbium, the mole ratio of the aforesaid catalyst and catalyst activators being in the range of 1:0.15–6:0.3–2 respectively.

3. The process of obtaining an acetone insoluble ethylene dimethacrylate solid polymer having a melting point above 240° which comprises contacting ethylene dimethacrylate in an n-heptane solvent with a catalyst consisting essentially of aluminum triethyl in combination with catalyst activators consisting essentially of tri-n-butyl amine and an anhydrous trivalent chloride of a member of the group consisting of samarium and ytterbium, the mole ratio of said catalyst and catalyst activators being in the range 1:0.15–6:0.3–2 respectively.

4. In a process for polymerizing methyl methacrylate in the presence of a catalyst consisting of an aluminum trialkyl the improvement whereby the polymerization rate is increased comprising adding catalyst activators consisting essentially of tri-n-butyl amine and an anhydrous trivalent chloride of a member of the group consisting of samarium and ytterbium.

References Cited in the file of this patent

UNITED STATES PATENTS

| 2,932,633 | Juveland et al. | Apr. 12, 1960 |
| 2,953,586 | Hafner et al. | Sept. 20, 1960 |

FOREIGN PATENTS

| 833,579 | Great Britain | Apr. 27, 1960 |